United States Patent
Langer et al.

(10) Patent No.: US 10,999,070 B2
(45) Date of Patent: May 4, 2021

(54) SYSTEM AND METHOD FOR DECRYPTING COMMUNICATION OVER A UMTS NETWORK

(71) Applicant: Verint Systems Ltd., Herzliya (IL)

(72) Inventors: Itai Langer, Yavne (IL); Gil Leibovich, Rehovot (IL)

(73) Assignee: VERINT SYSTEMS LTD., Pituach (IL)

( * ) Notice: Subject to any disclaimer, the term of this patent is extended or adjusted under 35 U.S.C. 154(b) by 259 days.

(21) Appl. No.: 16/124,335

(22) Filed: Sep. 7, 2018

(65) Prior Publication Data
US 2019/0089535 A1 Mar. 21, 2019

(30) Foreign Application Priority Data
Sep. 7, 2017 (IL) .......................................... 254438

(51) Int. Cl.
*H04L 29/06* (2006.01)
*H04L 9/12* (2006.01)
(Continued)

(52) U.S. Cl.
CPC ............. *H04L 9/12* (2013.01); *H04W 12/001* (2019.01); *H04L 2209/80* (2013.01); *H04W 84/042* (2013.01)

(58) Field of Classification Search
CPC .... H04L 9/12; H04L 2209/80; H04W 12/001; H04W 84/042
See application file for complete search history.

(56) References Cited

U.S. PATENT DOCUMENTS

| 6,950,521 B1 | 9/2005 | Marcovici et al. |
| 7,269,157 B2 | 9/2007 | Klinker et al. |

(Continued)

FOREIGN PATENT DOCUMENTS

WO  2010/116292  10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Sarah Su
(74) *Attorney, Agent, or Firm* — Isus Intellectual Property PLL; Anthony Jason Mirabito (57) ABSTRACT

Systems and methods for monitoring voice and SMS communication exchanged over a UMTS network is described wherein a technique for quickly testing different Count-C values, until the correct value is ascertained is used. The Count-C parameter consists of a HyperFrame Number (HFN) and the system iteratively attempts to decrypt the packets using a series of candidate HFNs. For each of these candidate HFNs, and for each of the packets, the system produces a candidate Count-C by appending the sequence number (SN). The system then uses the candidate Count-C to calculate a candidate keystream block. Subsequently, the system uses the candidate keystream blocks to decrypt the packets, and then tests whether the packets were correctly decrypted. If the system deems the decryption successful, the system stops iterating through the candidate HFNs, and uses the candidate HFN that correctly decrypted the packets to decrypt subsequent packets in the communication session.

18 Claims, 3 Drawing Sheets

(51) Int. Cl.
   *H04W 12/00*  (2021.01)
   *H04W 84/04*  (2009.01)

(56) References Cited

U.S. PATENT DOCUMENTS

| | | | |
|---|---|---|---|
| 7,374,096 | B2 | 5/2008 | Overhultz et al. |
| 7,769,875 | B1 | 8/2010 | Moisand et al. |
| 8,215,546 | B2 | 7/2012 | Lin et al. |
| 8,351,900 | B2 | 1/2013 | Lotvonen et al. |
| 8,496,169 | B2 | 7/2013 | Christofferson |
| 9,385,865 | B2 | 7/2016 | Wix et al. |
| 2003/0031322 | A1* | 2/2003 | Beckmann ........ H04W 12/0609 380/278 |
| 2005/0108377 | A1 | 5/2005 | Lee et al. |
| 2005/0202815 | A1 | 9/2005 | Verma et al. |
| 2006/0026680 | A1 | 2/2006 | Zakas |
| 2006/0253703 | A1 | 11/2006 | Eronen et al. |
| 2006/0262742 | A1 | 11/2006 | Dommaraju et al. |
| 2008/0141376 | A1 | 6/2008 | Clausen et al. |
| 2008/0150698 | A1 | 6/2008 | Smith et al. |
| 2009/0036143 | A1 | 2/2009 | Martin et al. |
| 2009/0122762 | A1* | 5/2009 | Kitazoe ............... H04W 12/001 370/331 |
| 2009/0135730 | A1 | 5/2009 | Scott et al. |
| 2009/0172397 | A1 | 7/2009 | Kim |
| 2009/0267730 | A1 | 10/2009 | Zhang |
| 2010/0071065 | A1 | 3/2010 | Khan et al. |
| 2010/0124196 | A1 | 5/2010 | Bonar et al. |
| 2011/0080267 | A1 | 4/2011 | Clare et al. |
| 2011/0099620 | A1 | 4/2011 | Stavrou et al. |
| 2011/0150211 | A1 | 6/2011 | Anderson |
| 2012/0256730 | A1 | 10/2012 | Scott et al. |
| 2012/0308009 | A1* | 12/2012 | Venkatsuresh ........ H04W 12/02 380/274 |
| 2012/0327956 | A1 | 12/2012 | Vasudevan |
| 2014/0098797 | A1* | 4/2014 | Kanamarlapudi .... H04L 1/1867 370/336 |
| 2014/0148196 | A1 | 5/2014 | Bassan-Eskenazi et al. |
| 2014/0160955 | A1 | 6/2014 | Lum et al. |
| 2015/0023504 | A1* | 1/2015 | Wix ................... H04L 63/0457 380/274 |
| 2015/0135265 | A1 | 5/2015 | Bagrin |
| 2015/0180658 | A1* | 6/2015 | Korenfeld ............ H04W 12/02 380/270 |
| 2016/0050562 | A1 | 2/2016 | Pudney et al. |
| 2016/0182460 | A1* | 6/2016 | Alexander ............ H04W 12/08 380/270 |
| 2016/0269900 | A1 | 9/2016 | Goldfarb |
| 2017/0013121 | A1 | 1/2017 | Baeder et al. |
| 2017/0310486 | A1 | 10/2017 | Goldfarb |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.
Barkan, E.P., "Cryptanalysis of Ciphers and Protocols," Research Thesis submitted to the Senate of the Technion, Israel Institute of Technology, 2006, 200 pages.
"Cell Scanning and Catcher Detection in unnoticeable pocket size," NetHawk C2, Data sheet, version 1.4, EXFO, 2010, 4 pages.
Cellusys, "SS7 Vulnerabilities," e-book, 2016, 53 pages.
Engel, T., "SS7: Locate. Track. Manipulate." 2014, 55 pages.
Girardin, F., et al., "Detecting air travel to survey passengers on a worldwide scale," Journal of Location Based Services, 2010, 26 pages.
Kostrzewa, A., "Development of a man in the middle attack on the GSM Um-Interface," Master Thesis, 2011, 88 pages.
Meyer, U., et al., "On the Impact of GSM Encryption and Man-in-the-Middle Attacks on the Security of Interoperating GSM/UMTS Networks," proceedings of the 15$^{th}$ IEEE International Symposium on Personal, Indoor and Mobile Radio Communications, 2004, pp. 2876-2883.
Mourad, H., "The Fall of SS7—How Can the Critical Security Controls Help?" The SANS Institute, 2015, 29 pages.
Nohl, K., "Mobile self-defense," Security Research Labs, 2015, 24 pages.
Radiator, EAP-SIM, EAP-AKA and EAP-AKA' Support, White Paper, Open System Consultants Pty.Ltd., 2014, 17 pages.
Signaling System 7 (SS7) Security Report, Positive Technologies, 2014, 15 pages.
Strobel, D., "IMSI Catcher," Seminararbeit, Ruhr-Universität Bochum, 2007, pp. 13-24.
Vedaldi, A., "An implementation of SIFT detector and descriptor," University of California at Los Angeles, 2007, 7 pages.

* cited by examiner

SYSTEM AND METHOD FOR DECRYPTING COMMUNICATION OVER A UMTS NETWORK

FIELD OF THE DISCLOSURE

The present disclosure relates to the decryption of encrypted cellular communication.

BACKGROUND OF THE DISCLOSURE

In cellular communication, a client device (or "client") exchanges communication with a Radio Network Controller (RNC) of a cellular network, via a base station controlled by the RNC. "Downlink" communication refers to communication passed by the RNC to the client, while "uplink" communication refers to communication passed by the client to the RNC.

The Universal Mobile Telecommunications System (UMTS) is a third-generation ("3G") system for cellular networks that employs sophisticated encryption. In UMTS networks, communication may occur over various physical channels and/or sub-channels. Each physical channel or sub-channel may include various transport channels and/or sub-channels, each of which, in turn, may include various logical channels and/or sub-channels. Each logical channel or sub-channel may operate in the Radio Link Control (RLC) Acknowledged Mode (AM), the RLC Unacknowledged Mode (UM), or the RLC Transparent Mode (TM).

To encrypt a particular packet of communication prior to transmitting the packet, the client or RNC uses a keystream block that is a function of five parameters: (i) the length of the packet, (ii) the "direction" of the packet, which has a value of 0 (for uplink packets) or 1 (for downlink packets), (iii) a five-bit identifier of the logical channel (or sub-channel), known as the "bearer channel," through which the packet is to be passed, (iv) a 32-bit ciphering sequence number known as "Count-C," and (v) a ciphering key known as "CK." To decrypt the packet, the receiving party uses the same keystream block that was used to encrypt the packet.

To start a communication session with a particular client, the RNC passes, e.g., over the common Forward Access Channel (FACH), an unencrypted Radio Resource Control (RRC) connection setup packet. This packet specifies the client, and also specifies a physical channel known as a Dedicated Control Channel (DCCH). The client, upon receiving this packet, then tunes to the specified DCCH. Subsequently, after the passing of any other relevant communication (such as a location update from the client), encrypted communication may be passed over the DCCH. (Communication may be passed in parallel over multiple logical channels of the DCCH.) For example, Short Message Service (SMS) communication may be passed over an RLC AM logical channel. As another example, to begin voice communication, the RNC may pass, over the DCCH, a "radio bearer setup" message that specifies one or more channels over which the voice communication will be passed. The client may then tune to the specified channels, and the voice communication may then be passed, encrypted, over these channels.

In RLC AM and RLC UM, the Count-C parameter consists of a HyperFrame Number (HFN) followed by a sequence number (SN). In RLC AM, the HFN consists of 20 bits, while the SN consists of 12 bits; in RLC UM, the HFN consists of 25 bits, while the SN consists of 7 bits. For each logical channel that is opened, the HFN and SN are initialized to respective initial values. In particular, in RLC AM, the HFN is initialized to a 20-bit START parameter that is passed from the client to the RNC; in RLC UM, the initial value of HFN is derived from START by padding START with five trailing zeros. Following the opening of the channel, the SN, which is specified in each packet, is incremented for each packet passed over the channel. After the SN reaches its maximum value (e.g., 127 for a 7-bit SN), the SN is reset to its initial value, and the HFN is incremented.

In RLC TM, the Count-C parameter consists of a 24-bit HFN followed by an 8-bit connection frame number (CFN). For each RLC TM channel, the initial value of HFN is derived from START by padding START with four trailing zeros. The CFN is derived separately for each packet from a system frame number (SFN), which is broadcast by the base station via which the communication is passed and is incremented periodically. After the CFN reaches its maximum value of 255, the CFN is reset, and the HFN is incremented.

In some cases, a security or law-enforcement agency may wish to monitor communication exchanged over a UMTS network. This is challenging, however, due to the sophisticated encryption employed by UMTS.

US Patent Application Publication 2016/0182460 describes a method in a receiver, including receiving from a transmitter a sequence of communication packets, which carry data encrypted with an encryption scheme. The encryption scheme depends on a counter value that is incremented independently by each of the transmitter and the receiver. Attempts are made to decrypt the data of a received packet multiple times using different, respective counter values, to produce multiple respective decrypted outputs. A decrypted output in which the data has been decrypted correctly is identified, the counter value is corrected, and the data of the received packet is recovered from the identified decrypted output.

U.S. Pat. No. 9,385,865 describes a method including, in a mobile communication terminal, receiving a signal, which carries media content that has been encrypted after being compressed in accordance with a compression protocol having a plurality of predefined configurations. Each configuration specifies a respective compression mode of the compression protocol. The received signal is decrypted, and one or more parameters that define a configuration of the compression protocol that was used for compressing the media content are determined from the decrypted signal. An absence of match is detected when the determined one or more parameters do not match any of the plurality of predetermined configurations of the compression protocol. An error in decrypting the received signal is identified based on detecting the absence of a match.

US Patent Application Publication 2016/0269900, whose disclosure is incorporated herein by reference, describes a monitoring system that monitors authentication sessions both on the air interface between the terminals and the network, and on at least one wired network-side interface between network-side elements of the network. The monitoring system constructs a database of sets of network-side authentication parameters using network-side monitoring. Each set of network-side authentication parameters originates from a respective authentication session and is associated with the International Mobile Station Identity (IMSI) of the terminal involved in the session. In order to start decrypting the traffic of a given terminal, the system obtains the off-air authentication parameters of that terminal using off-air monitoring, and finds an entry in the database that matches the air-interface authentication parameters. From the combination of correlated network-side and off-air authentication parameters, the processor is able to extract the parameters needed for decryption.

SUMMARY OF THE DISCLOSURE

There is provided, in accordance with some embodiments of the present disclosure, a system for decrypting a communication session on a Universal Mobile Telecommunications System (UMTS) network. The system includes a receiver and a processor. The processor is configured to receive, via the receiver, one or more packets, belonging to the communication session, that were encrypted using a HyperFrame Number (HFN) that is unknown to the processor. The processor is further configured to attempt, iteratively, to decrypt the packets using a series of candidate HFNs, by calculating, from each candidate HFN in the series, respective keystream blocks for the one or more packets, decrypting the packets using the respective keystream blocks, and testing whether the packets were correctly decrypted. The processor is further configured to identify among the candidate HFNs, based on the testing, a correct HFN using which the packets were correctly decrypted, and to decrypt one or more further packets belonging to the communication session, using the correct HFN.

In some embodiments, the processor is configured to calculate the respective keystream blocks from the candidate HFN by:

generating respective 32-bit candidate Count-C numbers, by appending respective Sequence Numbers specified in the packets to the candidate HFN, and calculating the respective keystream blocks from the respective candidate Count-C numbers.

In some embodiments, the processor is configured to attempt, iteratively, to decrypt the packets by repeatedly incrementing the candidate HFN in response to ascertaining that the packets were not decrypted correctly.

In some embodiments, the processor is further configured to initialize the candidate HFN to a value that is independent of any prior communication session.

In some embodiments, the processor is configured to initialize the candidate HFN to a value of zero.

In some embodiments, the processor is configured to test whether the packets were correctly decrypted by applying one or more initial tests to the decrypted packets, and, in response to at least one of the initial tests indicating at least a given likelihood that the packets were correctly decrypted, applying at least one subsequent test to the decrypted packets, and the processor is configured to identify the correct HFN in response to the subsequent test indicating that the packets were correctly decrypted.

In some embodiments, the processor is configured to apply the initial tests to the decrypted packets by comparing, to a threshold, an absolute difference between a number of ones in the packets and a number of zeros in the packets.

In some embodiments, the processor is configured to apply the initial tests to the decrypted packets by performing a chi-squared test on a distribution of data in the decrypted packets.

In some embodiments, the processor is configured to apply the subsequent test to the decrypted packets by decoding the decrypted packets.

In some embodiments, the processor is configured to apply the subsequent test to the decrypted packets by comparing a structure of each of the packets to a respective template.

There is further provided, in accordance with some embodiments of the present disclosure, a method for decrypting a communication session on a Universal Mobile Telecommunications System (UMTS) network. The method includes receiving, by a monitoring system, one or more packets, belonging to the communication session, that were encrypted using a HyperFrame Number (HFN) that is unknown to the monitoring system. The method further comprises, using the monitoring system, iteratively attempting to decrypt the packets using a series of candidate HFNs, by calculating, from each candidate HFN in the series, respective keystream blocks for the one or more packets, decrypting the packets using the respective keystream blocks, and testing whether the packets were correctly decrypted. The method further comprises, based on the testing, identifying among the candidate HFNs a correct HFN using which the packets were correctly decrypted, and decrypting one or more further packets belonging to the communication session, using the correct HFN.

The present disclosure will be more fully understood from the following detailed description of embodiments thereof, taken together with the drawings, in which:

DETAILED DESCRIPTION OF EMBODIMENTS

Overview

Embodiments of the present disclosure include systems and methods for monitoring voice and SMS communication exchanged over a UMTS network.

As described above, to decrypt a communication packet, it is necessary to know the keystream block that was used to encrypt the packet. Knowing the keystream block, in turn, requires that five parameters be known. Of these parameters, the Count-C parameter may be particularly challenging to ascertain, for at least two reasons:

(i) In many cases, when monitoring communication exchanged between a base station and a client, it is possible to receive downlink communication from the base station, since such communication is transmitted with relatively high power, but it is not possible to receive uplink communication from the client. Hence, even though the START parameter, from which the Count-C parameter is derived, is passed from the client to the RNC, it may not be possible to obtain this parameter.

(ii) Since the Count-C parameter includes 32 bits, this parameter may have, in theory, any one of $2^{32}$ values.

To address this challenge, embodiments of the present disclosure apply a technique for quickly testing different Count-C values, until the correct value is ascertained. First, the monitoring system monitors downlink communication passed through the FACH. Upon receiving an RRC connection setup packet destined for a client of interest, the system tunes to the DCCH specified in this packet, such that the system begins to receive encrypted packets over this channel. (It is noted that in the context of the present application, including the claims, the word "channel" may refer to any physical, transport, or logical channel or sub-channel.)

After receiving, over a given logical channel of the DCCH, a certain number of packets that were encrypted (i.e., that contain data encrypted) using an HFN that is unknown to the system, the system iteratively attempts to decrypt the packets using a series of candidate HFNs. For each of these candidate HFNs, and for each of the packets, the system produces a candidate Count-C by appending the SN, which is specified (unencrypted) in the packet, to the candidate HFN. (Alternatively, for each RLC TM packet, the system may derive a CFN from the SFN broadcast by the base station at the time the packet was received, and produce the candidate Count-C by appending the CFN to the candidate HFN.) The system then uses the candidate Count-C to calculate a candidate keystream block.

Subsequently, the system uses the candidate keystream blocks to decrypt the packets, and then tests whether the packets were correctly decrypted. If the system deems the decryption successful, the system stops iterating through the candidate HFNs, and uses the candidate HFN that correctly decrypted the packets to decrypt subsequent packets in the communication session, as further described below. Otherwise, the system tries the next candidate HFN.

Typically, several techniques are used to expedite the iteration through the candidate HFNs. First, the system typically tries smaller candidate HFNs before trying larger values. Since, typically, START is reset to zero for each new CK value that is used, and is then incremented by only one or two for each new connection setup, the HFN value tends to be relatively small. Hence, by trying smaller values first, the correct HFN may be ascertained more quickly, relative to if the system were to begin with larger values. Thus, for example, the system may begin with a candidate HFN of zero, and then increment the candidate HFN value by one in each subsequent iteration, until the correct HFN value is found.

Second, the system typically implements one or more quick sanity checks on the decrypted packets, such that the system may quickly reject any incorrect HFN values. A more rigorous examination of the decrypted packets is performed only if the packets pass at least one of the sanity checks.

For example, the system may calculate the total number $N_1$ of ones, and the total number $N_0$ of zeros, in the packets, and then compare $|N_1-N_0|$ to a threshold. If $|N_1-N_0|$ is greater than the threshold, the system performs a more rigorous examination of the packets; otherwise, the system rejects the candidate HFN, unless the packets pass another one of the sanity checks that are performed. This first sanity check is premised on the assumption that a collection of unsuccessfully-decrypted packets is analogous a random sequence of bits, which generally has a similar number of ones and zeros, such that $|N_1-N_0|$ is small.

Alternatively or additionally, the system may perform a chi-squared test on the bit distribution, and/or byte distribution, of the decrypted packets. In performing such a test, the system calculates the chi-squared statistic of the distribution, and then compares this statistic to a threshold. If the chi-squared statistic is less than the threshold, the system performs a more rigorous examination of the packets; otherwise, the system rejects the candidate HFN, unless the packets pass another one of the sanity checks that are performed.

To perform a more rigorous examination, the system may decode (i.e., parse) each packet, and then check if the values of various fields are reasonable. For example, the system may check if the value of the "length" field in a particular packet matches the length of the packet. Alternatively or additionally, the system may compare the structure of the packet, i.e., the configuration of bytes within the packet, to a known template.

Upon this first set of encrypted packets passing the more rigorous examination, the system accepts the candidate HFN. The system may then decrypt subsequent communication passed over the same logical channel, or any other parallel or subsequently-opened logical channel, using this HFN value, as described in detail below with reference to FIG. 3.

If the system has knowledge of some (recent) prior communication session in which the client participated, the system may use this knowledge to initialize the candidate HFN to a value that is equal to, or close to, the true HFN value. However, it is emphasized that the techniques described herein help the system quickly, and correctly, decrypt the current communication session, even if the candidate HFN is initialized to a value that is independent of any prior communication session. For example, even if the system initializes the candidate HFN to zero, or to some other default initial value, the system may nonetheless quickly find the correct HFN value, by repeatedly incrementing the candidate HFN (e.g., by a fixed increment) until the correct HFN value is found.

System Description

Figure 1:
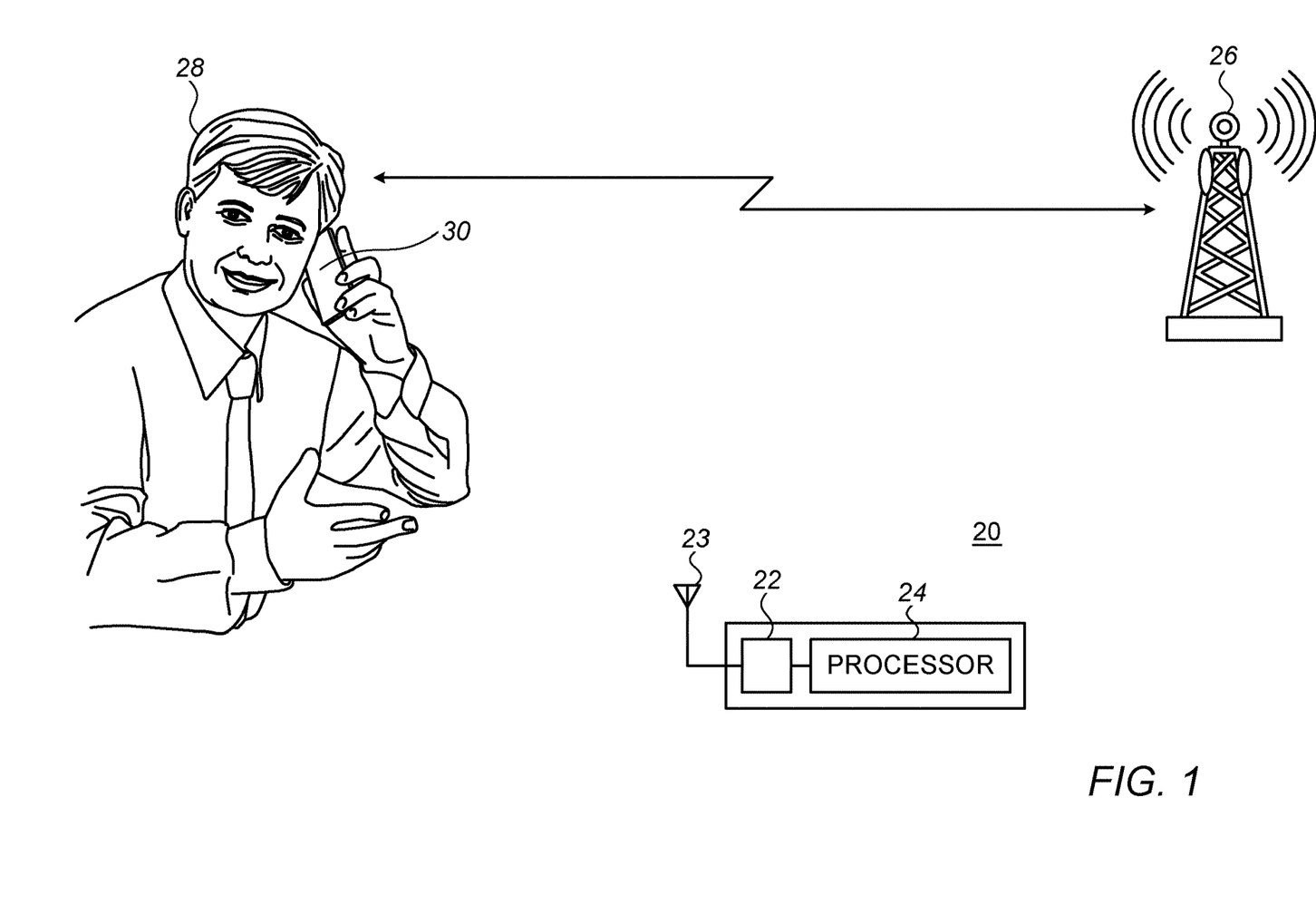
FIG. 1 is a schematic illustration of a monitoring system for monitoring communication over a UMTS cellular communication network, in accordance with some embodiments of the present disclosure.

Reference is initially made to FIG. 1, which is a schematic illustration of a monitoring system 20 for monitoring communication over a UMTS cellular communication network, in accordance with some embodiments of the present disclosure. FIG. 1 depicts a user 28 using a client device, such as a mobile phone 30, to exchange communication with a base station 26 belonging to the network. Monitoring system 20 is configured to monitor this communication, as described in detail hereinbelow.

Monitoring system 20, which may be placed at any suitable location within the geographic area covered by the network, comprises an antenna 23, a processor 24, and a receiver 22, which includes an analog-to-digital (A/D) converter, disposed between antenna 23 and processor 24. (Other circuitry, such as a low-noise amplifier and/or one or more diplexers, may be disposed between antenna 23 and receiver 22.) Processor 24 receives, via the antenna, receiver, and any other associated circuitry, packets communicated over the cellular network. (Typically, the senders of these packets do not intend for processor 24 to receive these packets.) Processor 24 then decrypts any encrypted packets of interest, using the techniques described below.

Typically, due to the smaller power level with which uplink communication is communicated, receiver 22 receives only downlink communication. In some cases, however, receiver 22 may additionally receive some uplink communication.

In general, processor 24 may be embodied as a single processor, or as a cooperatively networked or clustered set of processors, located at any suitable location(s). For example, processor 24 may comprise (i) a first processor, disposed in a common physical unit with receiver 22, configured to preprocess the received packets (e.g., such as to identify any packets of interest), and (ii) a cooperatively networked second processor, located remotely from the first processor, configured to more extensively process any packets received from the first processor (e.g., such as to decrypt these packets).

In some embodiments, the functionality of processor 24 that is described herein is implemented solely in hardware, e.g., using one or more Application-Specific Integrated Circuits (ASICs) or Field-Programmable Gate Arrays (FPGAs). In other embodiments, this functionality is at least partly implemented in software. For example, in some embodiments, the processor is embodied as a programmed digital computing device comprising a central processing unit (CPU) and random access memory (RAM). Program code, including software programs, and/or data are loaded into the RAM for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Figure 2:
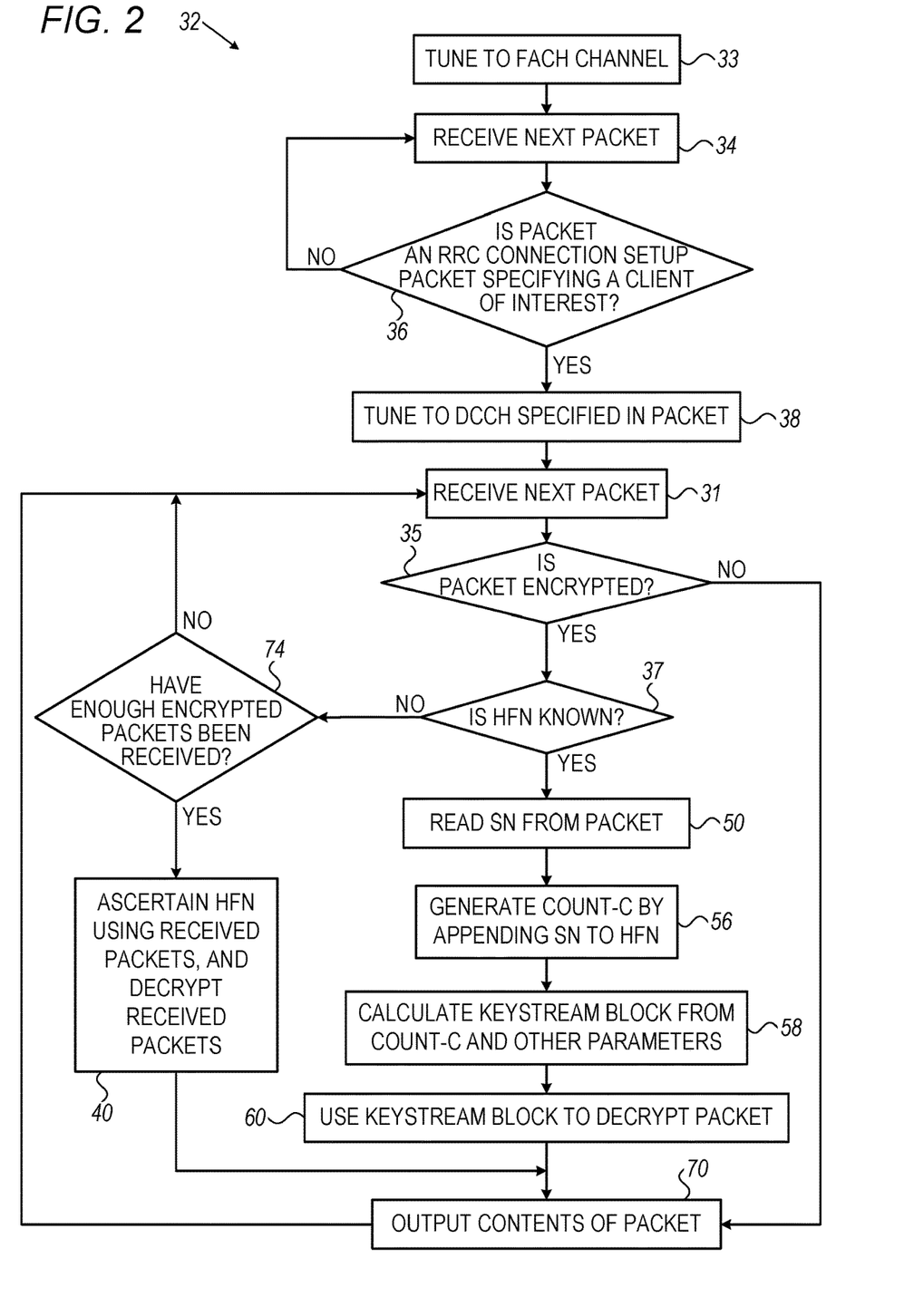
FIG. 2 is a flow diagram for a monitoring technique practiced by a monitoring system, in accordance with some embodiments of the present disclosure.

Reference is now made to FIG. 2, which is a flow diagram for a monitoring technique 32 practiced by monitoring system 20, in accordance with some embodiments of the present disclosure.

Technique 32 begins with a first tuning step 33, at which monitoring system 20 tunes to the FACH channel, or to any other channel over which RRC connection setup packets are expected to pass. Subsequently, the monitoring system begins to receive packets communicated over this channel, at an initial packet-receiving step 34. For each of these packets, processor 24 checks, at a first checking step 36, whether the packet is an RRC connection setup packet specifying a client of interest. If yes, the processor, at a second tuning step 38, tunes the monitoring system to the DCCH specified in the RRC connection setup packet.

Subsequently to tuning to the DCCH, the monitoring system begins to receive packets over any number of logical channels belonging to the DCCH, at a subsequent packet-receiving step 31. For each of these packets, the processor checks, at second checking step 35, whether the packet is encrypted. If not, the processor outputs the contents of the packet, at an outputting step 70. For example, the processor may store the contents of the packet in a digital memory, and/or present the contents to a user, such as by displaying the contents on a computer monitor, or, if the packet contains voice communication, playing the voice communication on an audio speaker. (In some cases, the packet might belong to a logical sequence of packets, such that the packet does not impart meaningful content on its own; in such cases, the processor may refrain from presenting the contents of the packet, until the entire logical sequence of packets has been received and, if necessary, decrypted.) The processor then returns to subsequent packet-receiving step 31.

If, on the other hand, the packet is encrypted, the processor checks, at a third checking step 37, if the HFN is known. If the HFN is known, the processor, at an SN-reading step 50, reads the SN from the packet, and then, at a Count-C-generating step 56, generates the Count-C parameter by appending the SN to the HFN. (For an RLC TM channel, instead of performing SN-reading step 50, the processor may receive the current SFN from the base station by tuning to the relevant broadcast, derive a CFN from the SFN, and then, at Count-C-generating step 56, generate the Count-C parameter by appending the CFN to the HFN.) Next, at a keystream-block-calculating step 58, the processor calculates a keystream block from the Count-C parameter, and then, at a decrypting step 60, uses the keystream block to decrypt the packet.

Returning now to third checking step 37, if the processor ascertains that the HFN is not known, the processor, at an HFN-ascertaining step 40, ascertains the HFN, as described above in the Overview, and as further described below with respect to FIG. 3.

Typically, to improve the statistical significance of the various tests applied in HFN-ascertaining step 40, and/or to facilitate identifying that the correct HFN was ascertained, HFN-ascertaining step 40 is applied to a plurality of encrypted packets (typically, a plurality of consecutively-received encrypted packets), rather than to an individual encrypted packet. Hence, typically, before applying HFN-ascertaining step 40, the processor, at a fourth checking step 74, checks if enough encrypted packets have been received. In other words, the processor compares the number of received encrypted packets to a threshold, such as, for example, any threshold between two and ten. If the number of received encrypted packets is less than this threshold, the processor receives more encrypted packets; otherwise, the processor proceeds with HFN-ascertaining step 40. (In ascertaining the HFN at HFN-ascertaining step 40, the processor also decrypts the packets.) The processor then outputs the contents of the decrypted packets, at outputting step 70.

Figure 3:
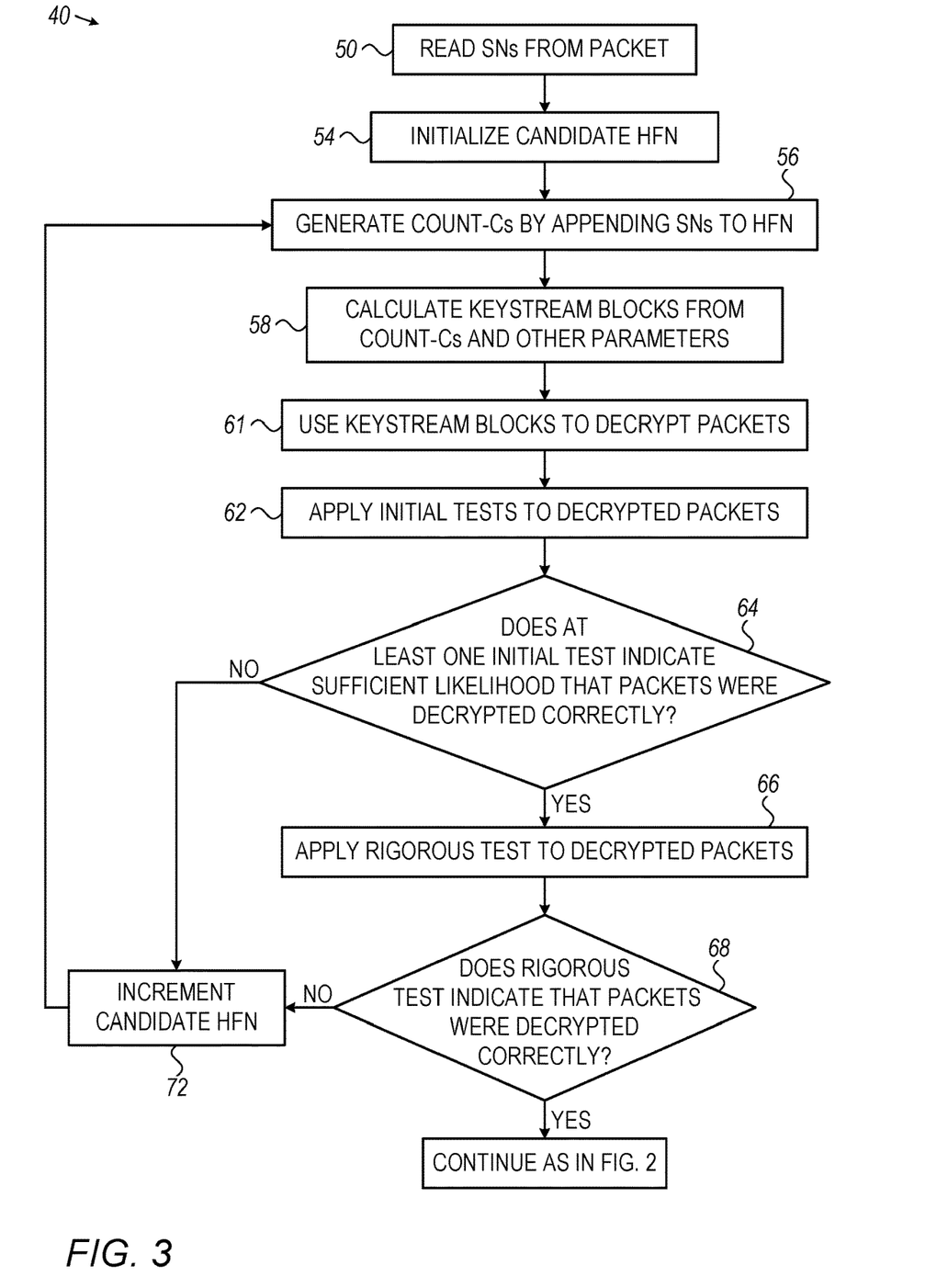
FIG. 3 is a flow diagram for a method for ascertaining an HFN value, in accordance with some embodiments of the present disclosure.

Reference is now made to FIG. 3, which is a flow diagram for a method for ascertaining an HFN value, in accordance with some embodiments of the present disclosure. FIG. 3 specifies a particular embodiment of HFN-ascertaining step 40 of FIG. 2, in which the processor operates on a plurality of encrypted packets. Per this embodiment, for each candidate HFN in a series of candidate HFNs, the processor calculates, from the candidate HFN, respective keystream blocks for the packets, decrypts the packets using the respective keystream blocks, and then tests whether the packets were decrypted correctly. Based on the testing, the processor identifies the correct HFN, which correctly decrypts these packets. The processor may subsequently use the correct HFN to decrypt further packets belonging to the communication session.

First, the processor, at SN-reading step 50, reads the SNs from the packets. (For RLC TM packets, the processor, instead of performing SN-reading step 50, receives the SFN for each packet in parallel with packet-receiving step 31 of monitoring technique 32, and then derives a CFN from the SFN. In other words, the processor receives the SFN that was broadcast at the time that the packet was received, derives a CFN from the SFN, and associates this CFN with the packet.) Next, at an initializing step 54, the processor initializes a candidate HFN. Typically, if the processor did not monitor a recent communication session with the client of interest, the candidate HFN is initialized to a value of zero, or to some other default initial value. On the other hand, if the processor recently monitored a prior communication session with the client of interest, the processor may initialize the candidate HFN by incrementing (e.g., by one or two) the START value that was used in this recently-monitored communication session, and then appending any zeros, as necessary.

Next, at Count-C-generating step 56, the processor generates a respective 32-bit candidate Count-C number for each of the packets, by appending the SN (or CFN) of the packet to the candidate HFN. Next, the processor, at keystream-block-calculating step 58, calculates a respective keystream block from each respective candidate Count-C number, and, at a tentative decrypting step 61, uses each of these keystream blocks to decrypt a respective one of the packets.

Subsequently, at an initial testing step 62, the processor applies one or more initial tests to the encrypted packets. These initial tests, or sanity checks, help the processor quickly ascertain whether there is at least some threshold likelihood that the candidate HFN is correct. Each of these initial tests may be applied to each of the packets separately, and/or to all of the packets together.

As an example of an initial test, as described above in the Overview, the processor may compare the absolute difference between (i) the total number of ones in the packets, and (ii) the total number of zeros in the packets, to a threshold. As another example, as described above in the Overview, the processor may perform a chi-squared test on the distribution of data—such as the distribution of bits or bytes—in the decrypted packets.

Subsequently, at an initial-test-evaluating step 64, the processor checks if at least one of the initial tests indicates at least a given likelihood that the packets were decrypted correctly. If yes, the processor, at a rigorous testing step 66, applies at least one subsequent, more rigorous test to the decrypted packets. This test may be applied to each of the packets separately, and/or to all of the packets together. For example, as described above in the Overview, the processor may decode each of the decrypted packets, and/or compare the structure of each of the decrypted packets to a respective template.

Next, at a rigorous-test-evaluating step 68, the processor checks if the more rigorous test indicates (with sufficient likelihood) that the packets were decrypted correctly. If yes, the processor ascertains that the packets were decrypted correctly, and therefore continues with the steps subsequent to HFN-ascertaining step 40, described above with reference to FIG. 2.

If, on the other hand, at initial-test-evaluating step 64 or rigorous-test-evaluating step 68, the processor ascertains that the packets were not decrypted correctly, the processor increments the candidate HFN, typically by one, at an HFN-incrementing step 72. (For example, a candidate HFN of . . . 000 may be incremented to . . . 001.)

Following HFN-incrementing step 72, the processor generates new Count-C values at Count-C-generating step 56, and proceeds to test these new Count-C values as described above. The processor may thus repeatedly increment the candidate HFN (in response to ascertaining that the packets were not correctly decrypted) and test if the packets were correctly decrypted, until, based on the testing, the processor ascertains that the packets were correctly decrypted. The processor may then decrypt subsequent packets belonging to the communication session using the ascertained HFN value, as described above with reference to FIG. 2, and as further described immediately below.

It is noted that, in any given communication session, the processor may need to use a plurality of different HFN values to decrypt the communication. For example, as described above, logical channels operating in different respective modes have initial HFNs that differ with respect to the number of zeros appended to the main 20 bits of the HFN. Moreover, as described above in the Background, the HFN may be incremented separately for each channel, as the SN or CFN cycles through its range of values. Advantageously, however, the processor typically ascertains the initial HFN value (typically over an RLC AM channel that is opened near the start of the communication session), and then derives all of the other required HFNs from this initial HFN, by adding or removing any zero-padding as required, and by incrementing the HFN each time that the processor observes that the SN or CFN has been reset. Hence, there is typically no need to perform HFN-ascertaining step 40 more than once per communication session, i.e., once per DCCH.

Notwithstanding the above, in some cases, the processor may ascertain the HFN only after the HFN was increased from its initial value, in which case the ascertained HFN will not successfully decrypt packets in a newly-opened channel. Nevertheless, the processor may identify that the ascertained HFN is not working—e.g., by identifying parsing errors in the decrypted packets—and then repeat HFN-ascertaining step 40 for the newly-opened channel. In such a case, the processor may use the previously-ascertained HFN as the initial candidate HFN, and then decrement the candidate HFN (in lieu of incrementing the candidate HFN at HFN-incrementing step 72) until the packets are successfully decrypted.

In summary, it is noted that the ascertained HFN may be used to decrypt all subsequent packets passed over the DCCH, in that each subsequent packet may be decrypted using either (i) the ascertained HFN itself, or (ii) another HFN derived therefrom by adding or removing trailing zeros, and/or by an increment or decrement operation, as described above.

As noted above in the Background, any given keystream block calculated at keystream-block-calculating step 58 is a function of four parameters, in addition to Count-C. Of these four parameters, only the CK ciphering key is relatively challenging to ascertain. Advantageously, however, embodiments of present disclosure include various techniques for ascertaining CK. (These techniques may be similar to those described in Israel patent application 245,299 or US Patent Application Publication 2016/0269900, whose disclosures are incorporated herein by reference.) For example, a Signaling System 7 (SS7) probe may receive authentication vectors, each of which includes a CK value, communicated from the Home Location Register (HLR) server that serves the cellular network, by monitoring communication on the SS7 network. The probe may then store these authentication vectors in a database, in association with the respective devices for which these vectors are intended. Subsequently, upon beginning to monitor a communication session of a client device of interest, processor 24 may retrieve the relevant CK value from the database.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for decrypting a communication session on a Universal Mobile Telecommunications System (UMTS) network, the system comprising:
   a receiver; and
   a processor, configured:

to receive, via the receiver, one or more packets, belonging to the communication session, that were encrypted using a HyperFrame Number (HFN) that is unknown to the processor, to attempt, iteratively, to decrypt the packets using a series of candidate HFNs, by:
- calculating, from each candidate HFN in the series, respective keystream blocks for the one or more packets,
- decrypting the packets using the respective keystream blocks, and
- testing whether the packets were correctly decrypted, to identify among the candidate HFNs, based on the testing, a correct HFN using which the packets were correctly decrypted, and to decrypt one or more further packets belonging to the communication session, using the correct HFN;

wherein the processor is configured to test whether the packets were correctly decrypted by applying one or more initial tests to the decrypted packets, and, in response to at least one of the initial tests indicating at least a given likelihood that the packets were correctly decrypted, applying at least one subsequent test to the decrypted packets, and wherein the processor is configured to identify the correct HFN in response to the subsequent test indicating that the packets were correctly decrypted.

2. The system according to claim 1, wherein the processor is configured to calculate the respective keystream blocks from the candidate HFN by:
- generating respective 32-bit candidate Count-C numbers, by appending respective Sequence Numbers specified in the packets to the candidate HFN, and
- calculating the respective keystream blocks from the respective candidate Count-C numbers.

3. The system according to claim 1, wherein the processor is configured to attempt, iteratively, to decrypt the packets by repeatedly incrementing the candidate HFN in response to ascertaining that the packets were not decrypted correctly.

4. The system according to claim 1, wherein the processor is further configured to initialize the candidate HFN to a value that is independent of any prior communication session.

5. The system according to claim 4, wherein the processor is configured to initialize the candidate HFN to a value of zero.

6. The system according to claim 1, wherein the processor is configured to apply the initial tests to the decrypted packets by comparing, to a threshold, an absolute difference between a number of ones in the packets and a number of zeros in the packets.

7. The system according to claim 1, wherein the processor is configured to apply the initial tests to the decrypted packets by performing a chi-squared test on a distribution of data in the decrypted packets.

8. The system according to claim 1, wherein the processor is configured to apply the subsequent test to the decrypted packets by decoding the decrypted packets.

9. The system according to claim 1, wherein the processor is configured to apply the subsequent test to the decrypted packets by comparing a structure of each of the packets to a respective template.

10. A method for decrypting a communication session on a Universal Mobile Telecommunications System (UMTS) network, the method comprising:

receiving, by a monitoring system, one or more packets, belonging to the communication session, that were encrypted using a HyperFrame Number (HFN) that is unknown to the monitoring system;

using the monitoring system, iteratively attempting to decrypt the packets using a series of candidate HFNs, by:
- calculating, from each candidate HFN in the series, respective keystream blocks for the one or more packets,
- decrypting the packets using the respective keystream blocks, and
- testing whether the packets were correctly decrypted;

based on the testing, identifying among the candidate HFNs a correct HFN using which the packets were correctly decrypted; and decrypting one or more further packets belonging to the communication session, using the correct HEN;

wherein testing whether the packets were correctly decrypted comprises applying one or more initial tests to the decrypted packets, and, in response to at least one of the initial tests indicating at least a given likelihood that the packets were correctly decrypted, applying at least one subsequent test to the decrypted packets, and wherein identifying the correct HFN comprises identifying the correct HFN in response to the subsequent test identifying that the packets were correctly decrypted.

11. The method according to claim 10, wherein calculating the respective keystream blocks from the candidate HFN comprises:
- generating respective 32-bit candidate Count-C numbers, by appending respective Sequence Numbers specified in the packets to the candidate HFN; and
- calculating the respective keystream blocks from the respective candidate Count-C numbers.

12. The method according to claim 10, wherein iteratively attempting to decrypt the packets comprises repeatedly incrementing the candidate HFN in response to ascertaining that the packets were not decrypted correctly.

13. The method according to claim 10, further comprising initializing the candidate HFN to a value that is independent of any prior communication session.

14. The method according to claim 13, wherein initializing the candidate HFN comprises initializing the candidate HFN to a value of zero.

15. The method according to claim 10, wherein applying the initial tests to the decrypted packets comprises comparing, to a threshold, an absolute difference between a number of ones in the packets and a number of zeros in the packets.

16. The method according to claim 10, wherein applying the initial tests to the decrypted packets comprises performing a chi-squared test on a distribution of data in the decrypted packets.

17. The method according to claim 10, wherein applying the subsequent test to the decrypted packets comprises applying the subsequent test to the decrypted packets by decoding the decrypted packets.

18. The method according to claim 10, wherein applying the subsequent test to the decrypted packets comprises applying the subsequent test to the decrypted packets by comparing a structure of each of the packets to a respective template.

* * * * *